United States Patent
Patel et al.

(10) Patent No.: US 9,529,848 B2
(45) Date of Patent: Dec. 27, 2016

(54) PREDICTIVE QUERY RESULT COMPUTATION

(71) Applicant: VMware, Inc., Palo Alto, CA (US)

(72) Inventors: Jay A. Patel, Mountain View, CA (US);
Zhenmin Li, San Jose, CA (US);
Chengdu Huang, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 246 days.

(21) Appl. No.: 14/099,647

(22) Filed: Dec. 6, 2013

(65) Prior Publication Data
US 2015/0161211 A1 Jun. 11, 2015

(51) Int. Cl.
*G06F 17/30* (2006.01)

(52) U.S. Cl.
CPC .............................. *G06F 17/30457* (2013.01)

(58) Field of Classification Search
None
See application file for complete search history.

(56) References Cited

U.S. PATENT DOCUMENTS

| | | | |
|---|---|---|---|
| 6,775,666 B1 | 8/2004 | Stumpf et al. | |
| 7,693,813 B1* | 4/2010 | Cao | G06F 17/30616 707/999.001 |
| 2003/0058837 A1 | 3/2003 | Denney et al. | |
| 2004/0088274 A1* | 5/2004 | Xu | G06F 17/30097 |
| 2005/0165753 A1* | 7/2005 | Chen | G06F 17/30867 |
| 2007/0055555 A1 | 3/2007 | Baggett et al. | |
| 2007/0168336 A1* | 7/2007 | Ransil | G06F 17/3089 |
| 2009/0037489 A1* | 2/2009 | Grundler | G06Q 10/10 |
| 2009/0216718 A1 | 8/2009 | Agrawal et al. | |
| 2010/0082655 A1* | 4/2010 | Silberstein | G06F 17/30477 707/759 |
| 2010/0168994 A1 | 7/2010 | Bourque et al. | |
| 2010/0250540 A1* | 9/2010 | Adda | G06F 17/30312 707/737 |
| 2011/0208713 A1 | 8/2011 | Mintz | |
| 2013/0173662 A1 | 7/2013 | Kaplinger et al. | |
| 2015/0026692 A1 | 1/2015 | Ghosh | |

* cited by examiner

*Primary Examiner* — Syed Hasan

(57) ABSTRACT

Techniques for reducing query response time are provided. In one embodiment, a computer system can organize data into a plurality of buckets, where the data is ordered according to a dimension, and where each bucket includes a subset of data that corresponds to a range within the dimension. The computer system can then precompute, for one or more buckets in the plurality of buckets, query results for one or more queries against the bucket, and can store the precomputed query results in a cache.

21 Claims, 5 Drawing Sheets

PREDICTIVE QUERY RESULT COMPUTATION

BACKGROUND

Many traditional information retrieval systems operate according to a "receive query/execute query/return response" paradigm. With this paradigm, a user first submits a request for information, known as a query, to a query engine of the system. Upon receiving the query, the query engine executes the query against a body of data (i.e., the "data corpus") and generates a result. Finally, the query engine returns the generated result to the user, thereby fulfilling the user's information request.

While the foregoing paradigm works well in many scenarios, it can be problematic in certain cases where query response time (i.e., the latency between submitting a query and receiving a result) is important. For example, consider an environment where a user is interacting with an information retrieval system in real-time (via, e.g., a website or some other client-side interface). Due to the interactive nature of the environment, the user may expect to receive responses to submitted queries relatively quickly. However, because the "receive query/execute query/return response" paradigm requires each query to be executed in full upon query submission, if the execution time for a particular query is excessively long (due to, e.g., system load, the size of the data corpus being searched, and/or high query complexity), the user will have to wait a correspondingly long time before a result that is responsive to the query is returned. This, in turn, can adversely impact the usability/user-friendliness of the system.

One approach for addressing the problem above is to cache the result for each query as it is generated. With this approach, when a user submits a previously executed query, the result can be retrieved directly from the cache (without re-executing the query). Unfortunately, this approach works poorly in situations where the data corpus is dynamic in nature (e.g., is modified and/or grows in size on a frequent basis). In these situations, conventional caching will generally be ineffective because the cached query results will become invalid quickly (e.g., on any subsequent data write operation), thus requiring subsequent instances of the same query to be re-executed in full on the most recent data.

SUMMARY

Techniques for reducing query response time are provided. In one embodiment, a computer system can organize data into a plurality of buckets, where the data is ordered according to a dimension, and where each bucket includes a subset of data that corresponds to a range within the dimension. The computer system can then precompute, for one or more buckets in the plurality of buckets, query results for one or more queries against the bucket, and can store the precomputed query results in a cache.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for reducing query response time in an information retrieval system. In one set of embodiments, the techniques can include one or more of the following features: (1) the organization of ingested data into self-contained, disjoint units, referred to as "buckets"; (2) the monitoring of incoming user queries and the calculation of a list of "most expensive" user queries: (3) the precomputation of the most expensive user queries against each complete bucket, resulting in per-bucket cached query results; and (4) the processing of user queries in view of the per-bucket cached query results. Taken together, these features can enable the information retrieval system to process queries in a manner that appears instantaneous, or near-instantaneous, to users, without suffering from the drawbacks associated with conventional caching approaches.

Figure 1:
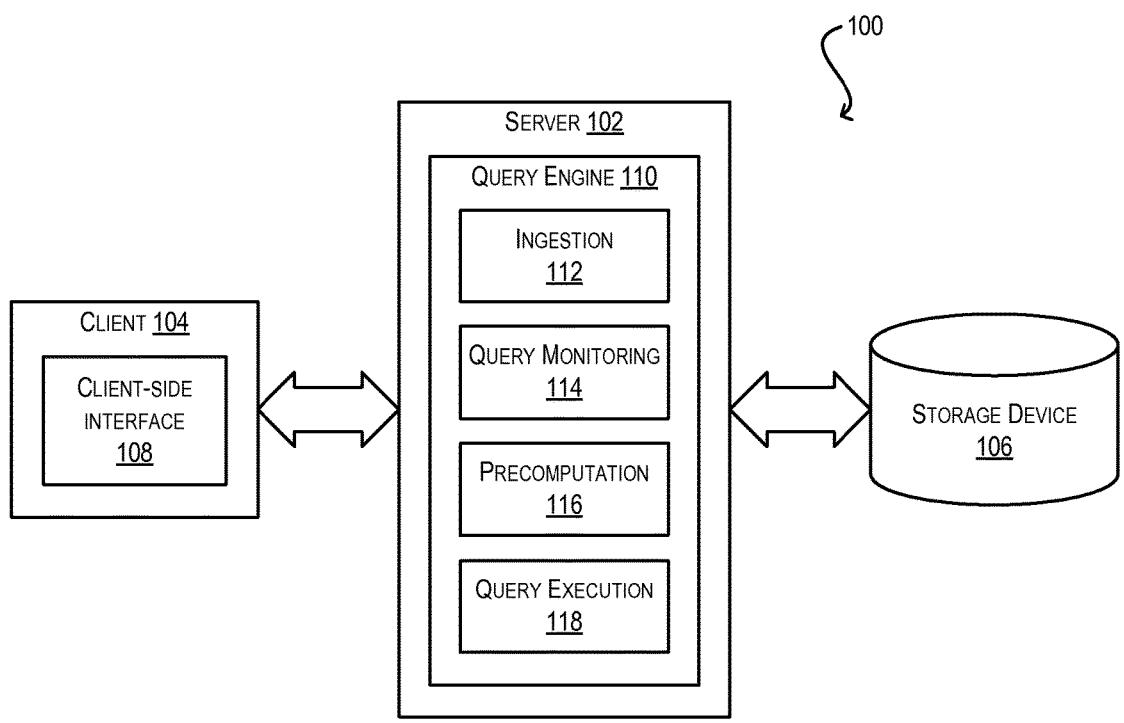
FIG. 1 depicts an information retrieval system according to an embodiment.

FIG. 1 depicts an example information retrieval system 100 according to an embodiment. As shown, information retrieval system 100 includes a server 102 that is in communication with a client 104 and a storage device 106. Although only a single server, client, and storage device are depicted, it should be appreciated that any number of these entities may be supported.

Client 104 is an end-user computing device, such as a desktop computer, a laptop computer, a personal digital assistant, a smartphone, a tablet, or the like. Client 104 is configured to execute (via, e.g., a standard web browser or proprietary software) a client-side interface 108, which enables a user of client 104 to interact with server 102 in order to retrieve data residing on storage device 106. For example, the user may use client-side interface 108 to submit information requests (i.e., queries), receive and view query results, and the like.

Server 102 is a computer system, such as a standalone or rack-mounted server system, that is configured to execute a query engine 110 for servicing user queries submitted via client 104 (and other similar clients). Generally speaking, query engine 110 can perform functions such as parsing incoming user queries (in order to, e.g., generate query plans), executing queries (either fully or in part) against data residing on storage device 106, and returning query results to the original requestors.

As noted the Background section, many traditional query engines process user queries according to a sequential "receive query/execute query/return response" paradigm. Thus, when a query is received in such an engine, it may take some time (depending on the processing load of the system) before a complete query result can be returned. This delay can be problematic in environments where query response time is an important aspect of overall system performance and usability.

To address these and other similar issues, query engine 110 of server 102 can include a number of modules—namely, ingestion module 112, query monitoring module 114, precomputation module 116, and query execution module 118—that collectively implement a novel form of query processing referred to as "predictive query result computation." With predictive query result computation, query engine 110 does not need to execute each user query in full upon query submission; instead, query engine 110 can precompute the results to certain historical user queries against data buckets and can store the precomputed results in a persistent cache. Query engine 110 can then process future user queries in view of the cached per-bucket results, thereby significantly reducing the amount of work (and thus time) needed to return complete query results to requesting users.

Figure 2:
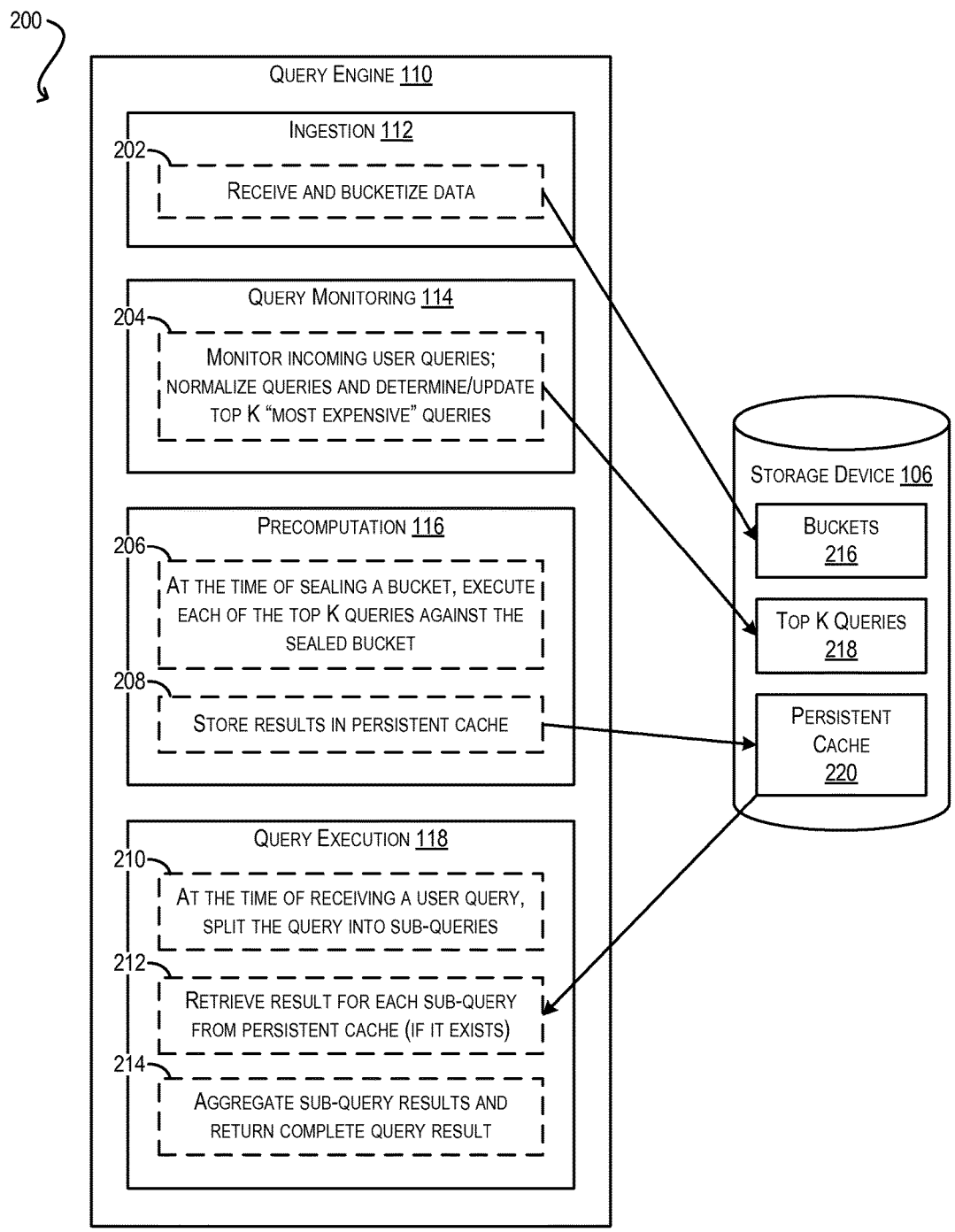
FIG. 2 depicts a flow within the context of FIG. 1 for implementing predictive query result computation according to an embodiment.

FIG. 2 depicts a high-level flow 200 of the processing that can be performed by modules 112-118 of query engine 110 in order to implement predictive query result computation according to an embodiment. Although flow 200 is shown via a series of numbered blocks 202 through 214, it should be noted that these blocks do not need to be performed sequentially. For example, in one embodiment, each module 112-118 can perform its designated processing in parallel with the other modules.

At block 202 of flow 200, ingestion module 112 can receive data to be incorporated into the data corpus of query engine 110 and can organize, or "bucketize," the data into self-contained, disjoint units, known as buckets. This is shown via the arrow leading from block 202 to buckets 216 residing on storage device 106. In one embodiment, each bucket can be stored as an individual file on storage device 106. In other embodiments, each bucket can be stored using any other type of data structure, such as a self-contained database.

Generally speaking, the data that is received by ingestion module 112 will be ordered according to at least one dimension. For instance, the data may correspond to time series data that is ordered by time. The bucketization process at block 202 can effectively partition the data along this dimension, such that each bucket covers a range, or window, of data within the dimension. In some embodiments, the dimension ranges for the buckets can be non-overlapping; in other embodiments, the dimension ranges can overlap to a degree.

By way of example, assume that the incoming data is time series data that is time-stamped according to its time of arrival at ingestion module 112. In this example, the bucketization process can comprise adding the incoming data to an "open" bucket, and continuing to fill the open bucket with data until it becomes full (e.g., reaches a preconfigured size). Once the current open bucket is full, ingestion module 112 can "seal" the bucket, which means the contents of the bucket can no longer be modified. This ensures that the bucket encompasses all of the data within a fixed time range spanning from the arrival of the first piece of data in the bucket to the arrival of the last piece of data in the bucket. Ingestion module 112 can then create a new open bucket to store data for the next time range, and the process can repeat indefinitely in this manner. As described in further detail below, the fact that each sealed bucket covers a fixed range of data can facilitate the precomputation of query results and the processing of future user queries based on the precomputed results.

Moving on to query monitoring module 114, at block 204 module 114 can monitor user queries as they are submitted by various clients and can "normalize" the queries. Generally speaking, the user queries that are received by query engine 110 will likely be constrained in some manner based on the bucketization dimension noted above. For example, if the bucketization dimension is time, many (if not all) of the user queries will include one or more time range constraints. Accordingly, the normalization process can remove these dimensional constraints, which allows two queries that differ only in terms of these constraints to be directly compared. The normalization process can also apply other small changes to equalize queries that are identical except for insignificant details (e.g., different variable names, ordering of constraints, etc.).

Once query monitoring module 114 has normalized any newly received queries, module 114 can compute/update a list of top K "most expensive" queries for the system (shown via the arrow leading from block 204 to top queries 218 residing on storage device 106), where K is a preconfigured number (e.g., 10, 100, 1000, etc.). These top K queries represent the historical, normalized user queries that are considered the best candidates for precomputation and caching. In one set of embodiments, the main criterion for determining the top K queries is the likelihood that a given query will be submitted again in the future. In these embodiments, the top K computation can take into account the number of times a given query has been submitted in the past, as well as other related factors (e.g., age of previous query submissions, etc.). In other embodiments, the determination of the top K queries can be based on other criteria, such as the amount of resources/processing time each query consumes, execution pattern, etc. One of ordinary skill in the art will recognize many variations, modifications, and alternatives for this computation. After computing/updating the top K queries, query monitoring module 114 can repeat block 204 on a continuous basis so that the top K queries is kept up-to-date in view of the system's real-time query load.

At the time a particular bucket is sealed, precomputation module 116 can execute each of the top K queries (as determined by query monitoring module 114 at block 204) against the sealed bucket (block 206). This results in the generation of K query results for the bucket (one for each top K query). If there are any outstanding user queries to be executed at the time of the bucket sealing, precomputation module 116 can delay or otherwise deprioritize the precomputation step so that the outstanding user queries are executed first (one mechanism for achieving this is described in U.S. patent application Ser. No. 14/106,313, filed Dec. 13, 2013, now U.S. Pat. No. 9,436,739, issued Sep. 6, 2016, entitled "Dynamic Priority-Based Query Scheduling").

Once the top K queries have been executed against the sealed bucket, precomputation module 116 can store the result for each query in a persistent cache (block 208; shown via the arrow from block 208 to persistent cache 220 residing on storage device 106). Precomputation module 116 can then return to block 206 to precompute query results for additional bucket(s) as they become sealed.

With per-bucket query results for the top K queries now residing in persistent cache 220 (per block 208), when a new user query is received, query execution module 118 can split the query into a number of "sub-queries" based on bucket boundaries (block 210). In other words, query execution module 118 can determine all of the buckets that fall (either entirely or partially) within the dimension range specified for the query, and for each of those buckets, can generate a sub-query that corresponds to a search for data in the bucket. For example, assume the following buckets exist in the system:

Bucket 23: spanning time 5001 to time 5125
Bucket 24: spanning time 5125 to time 5250
Bucket 25: spanning time 5250 to time 5375

Further assume that the user query received at block 210 corresponds to a search for all data messages received from host A between times 5100 and 5300. In this case, the query can be split into three sub-queries: a first sub-query for data messages received from host A between times 5100 and 5125 (corresponding to bucket 23), a second sub-query for data messages received from host A between times 5125 and 5250 (corresponding to bucket 24), and a third sub-query for data messages received from host A between times 5250 and 5300 (corresponding to bucket 25).

Query execution module 118 can then check persistent cache 220 and retrieve the cached query results for each sub-query/bucket (if they exist in the cache) (block 212). Generally speaking, for the top K queries, most of the sub-query results should be available in the cache, since they were previously computed/cached by precomputation module 116 at blocks 206 and 208. For any sub-queries that do not have a cached result in persistent cache 220 (e.g., sub-queries than span only a part of a bucket), query execution module 118 can execute the sub-query against its corresponding bucket in order to generate the sub-query result. Query execution module 118 can also cache the generated sub-query result at this point for future reuse.

For instance, returning to the example of buckets 23-25 above, query execution module 118 may determine that a matching sub-query result exists in persistent cache 220 for the second sub-query (i.e., the sub-query corresponding to bucket 24), since the second sub-query spans the entirety of bucket 24. Accordingly, query execution module 118 can retrieve this cached sub-query result directly from cache 220, without having to execute the second sub-query. On the other hand, query execution module 118 may determine that no matching sub-query results exist in persistent cache 220 for the first sub-query (i.e., the sub-query corresponding to bucket 23) or the third sub-query (i.e., the sub-query corresponding to bucket 25), since these sub-queries only span a portion of buckets 23 and 25 respectively. Thus, query execution module 118 can compute these sub-queries on demand. Generally speaking, for queries that are primed with precomputation, query execution module 118 will only need to process approximately two-half buckets' worth of data (corresponding to the two "bookend" buckets of the query's dimension range, such as 23 and 25 in this example), independent of how large the query dimension range is.

Finally, at block 214, query execution module 118 can aggregate the cached sub-query results retrieved at block 212 (along with any generated sub-query results) and can return the complete query result to the requestor. For example, query execution module 118 can aggregate the cached sub-query result for bucket 24 above with the generated sub-query results for buckets 23 and 25 in order to generate and return a complete result for the received user query.

With the approach shown in FIG. 2, query response time can be significantly reduced when compared to conventional query engines that process queries in a sequential manner (i.e., upon query submission), because the results for the top K queries will be precomputed and thus always available for quick retrieval from persistent cache 220. In information retrieval systems where certain types of queries are resubmitted on a frequent basis, this precomputation and caching can provide the perception of instantaneous (or near instantaneous) query execution to users.

Further, the approach of FIG. 2 overcomes the difficulties of implementing conventional query result caching in the context of a dynamic data corpus. In particular, since query engine 110 bucketizes the data corpus according to a dimension of interest (e.g., time), query engine 110 can precompute/cache query results on a per-bucket, rather than per-query basis. This, in turn, means that even if the data corpus grows in size along the dimension of interest between the time of precomputing a given query and receiving another submission of the same (or similar) query, there is no need to re-execute the query in full against the entire data corpus. Instead, query engine 110 can reuse the cached query results for complete buckets within the dimension range of the new query submission, and can simply compute additional query results for partial buckets. Query engine 110 can then aggregate the cached query results and the computed query results in order to provide a complete query result, thereby significantly reducing the amount of processing (and thus response time) required for the new query submission.

By way of example, consider a scenario where a user submits the following query on recurring basis: "Return all data messages containing the word 'error' that have been received over the last 24 hours." With conventional caching, the result generated by this query at a given point in time (e.g., time T1) will be cached. However, if the data corpus changes frequently (e.g., grows to include new messages), this cached result will become invalid very quickly. As a result, the cached result cannot be reused and the query will likely need to be executed in full for each future submission.

With predictive query result computation, query engine 110 can bucketize the data messages received over time into distinct buckets, and can precompute/cache query results for the top K queries against each bucket. Assuming that the query noted above is one of the top K queries, each time the query is submitted, query engine 110 can simply retrieve the cached query results for any complete (i.e., sealed) buckets within the past 24 hours, thus avoiding the need to recompute the query with respect to those time ranges. This means that query engine 110 only needs to execute the query against (1) new data that has been received/ingested by the system since the closure of the last bucket, and (2) old data that does not fully occupy an entire cached bucket (which totals, on average, about one bucket of data).

Figure 3:
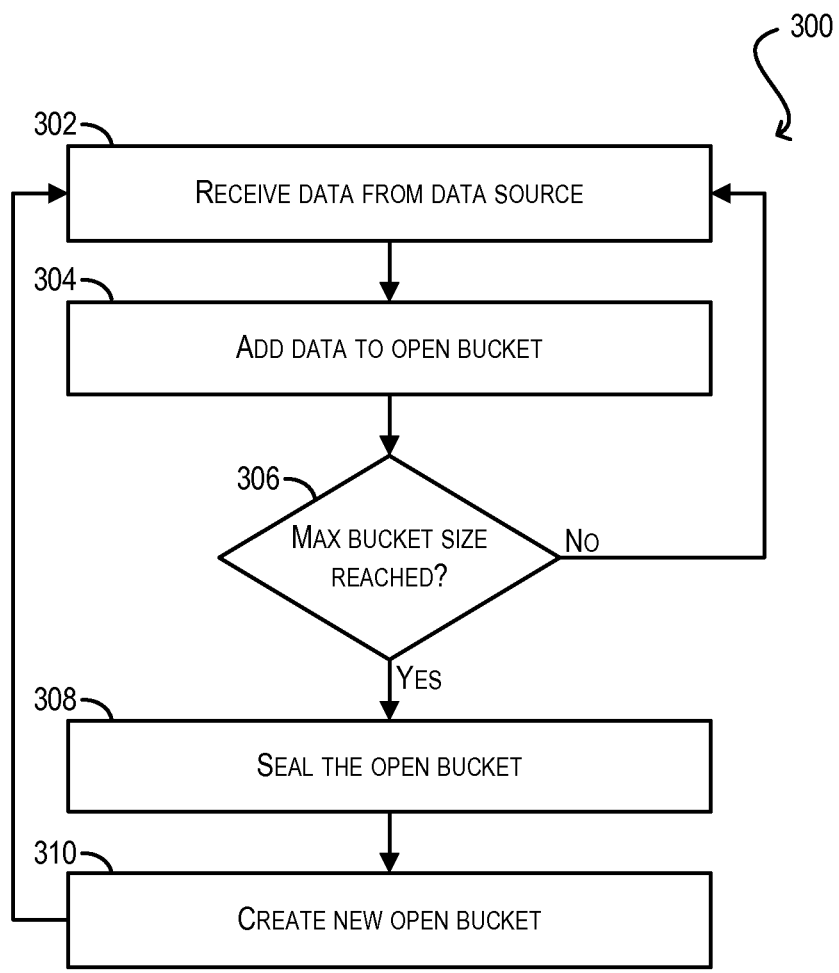
FIG. 3 depicts a flowchart for ingesting and bucketizing data according to an embodiment.

The remaining sections of this disclosure provide additional details regarding the processing that is attributed to modules 112-118 of query engine 110 in FIG. 2. For instance, FIG. 3 depicts a flowchart 300 that can be performed by ingestion module 112 in order to ingest and bucketize incoming data (per block 202 of FIG. 2) according to an embodiment.

At block 302 of flowchart 300, ingestion module 112 can receive, from a data source, data to be added to the data corpus. The data source can be, e.g., one of the clients connected to server 102 (e.g., client 104), or any other entity that is internal or external to server 102.

At blocks 304 and 306, ingestion module 112 can add the received data to a current open bucket and can check whether this addition causes the open bucket to exceed its preconfigured maximum size. If the maximum size of the bucket is not exceeded, flowchart 300 can return to block 302 and additional data can be added to the current open bucket.

On the other hand, if the maximum size of the bucket is exceeded, ingestion module 112 can seal the open bucket, thereby making the bucket immutable (block 308). Ingestion module 112 can then create a new open bucket (block 310), and flowchart 300 can return to block 302 so that additional data can be added to the new (now current) open bucket.

Figure 4:
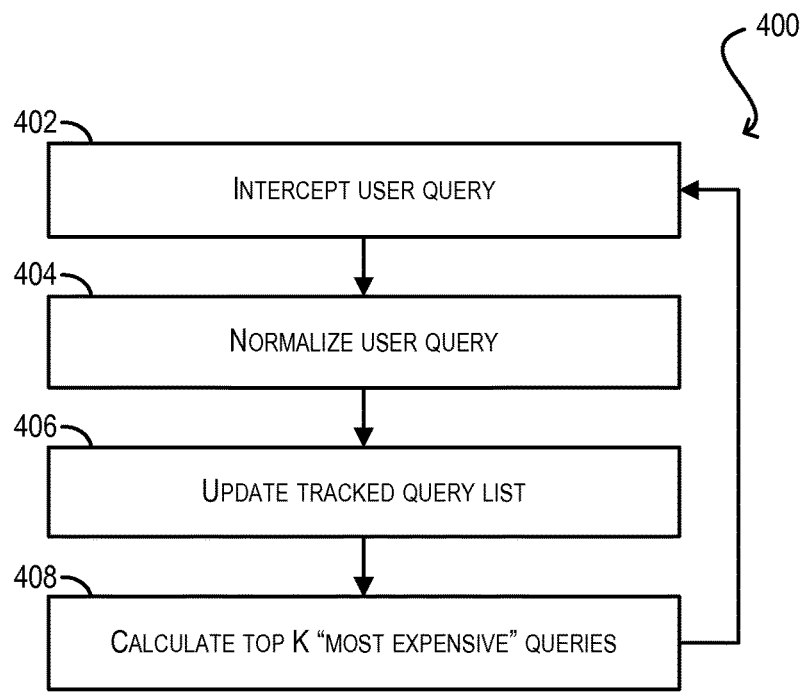
FIG. 4 depicts a flowchart for maintaining a list of "most expensive" user queries according to an embodiment.

FIG. 4 depicts a flowchart 400 that can be performed by query monitoring module 114 in order to compute/update the top K queries for the system (per block 204 of FIG. 2) according to an embodiment.

At blocks 402 and 404 of FIG. 4, query monitoring module 114 can intercept and normalize an incoming user query. As discussed with respect to FIG. 2, this normalization process can comprise stripping any constraints pertaining to the bucketization dimension, as well as modifying the query to conform to a standard format (e.g., standardizing variable names, constraint order, etc.).

At block 406, query monitoring module 114 can update a list of tracked queries with the normalized query. In a particular embodiment, this tracked list can be fixed in size (e.g., some multiple of K, such as 10×K), and older queries can be aged out from the list as new queries are received.

Once the tracked list has been updated, query monitoring module 114 can calculate the top K most expensive queries within the tracked list (block 408). As noted previously, this calculation can be based on a number of different factors, such as the number of times each query has been submitted in the past, the amount or resources/processing power the query consumes, execution pattern, and so on. Flowchart 400 can then return to block 402 so that the process can be repeated for additional incoming queries.

Figure 5:
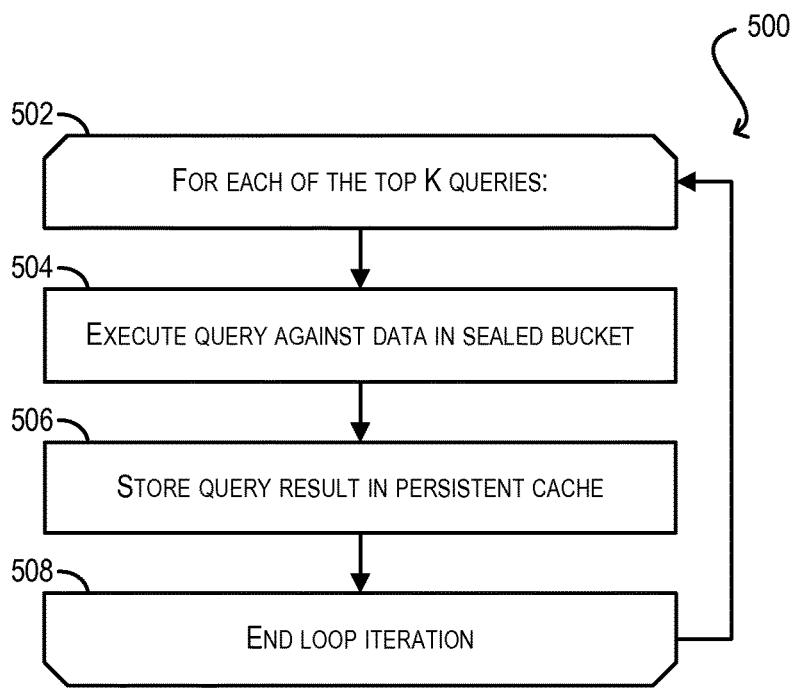
FIG. 5 depicts a flowchart for precomputing the most expensive user queries against one or more buckets in order to generate cached query results according to an embodiment.

FIG. 5 depicts a flowchart 500 that can be performed by precomputation module 116 in order to precompute query results for the top K queries and cache the results (per blocks 206 and 208 of FIG. 2) according to an embodiment. Flowchart 500 assumes that a bucket has recently been sealed by ingestion module 112.

At block 502 of flowchart 500, precomputation module 116 can enter a loop for each of the top K queries computed by query monitoring module 114. Within the loop, precomputation module 116 can execute the current query against the sealed bucket (block 504). This generates a query result that pertains specifically to the data within the bucket.

At block 506, precomputation module 116 can store the generated query result in persistent cache 220. The current loop iteration can subsequently end (block 508), and loop 502 can repeat until all of the top K queries have been processed.

Figure 6:
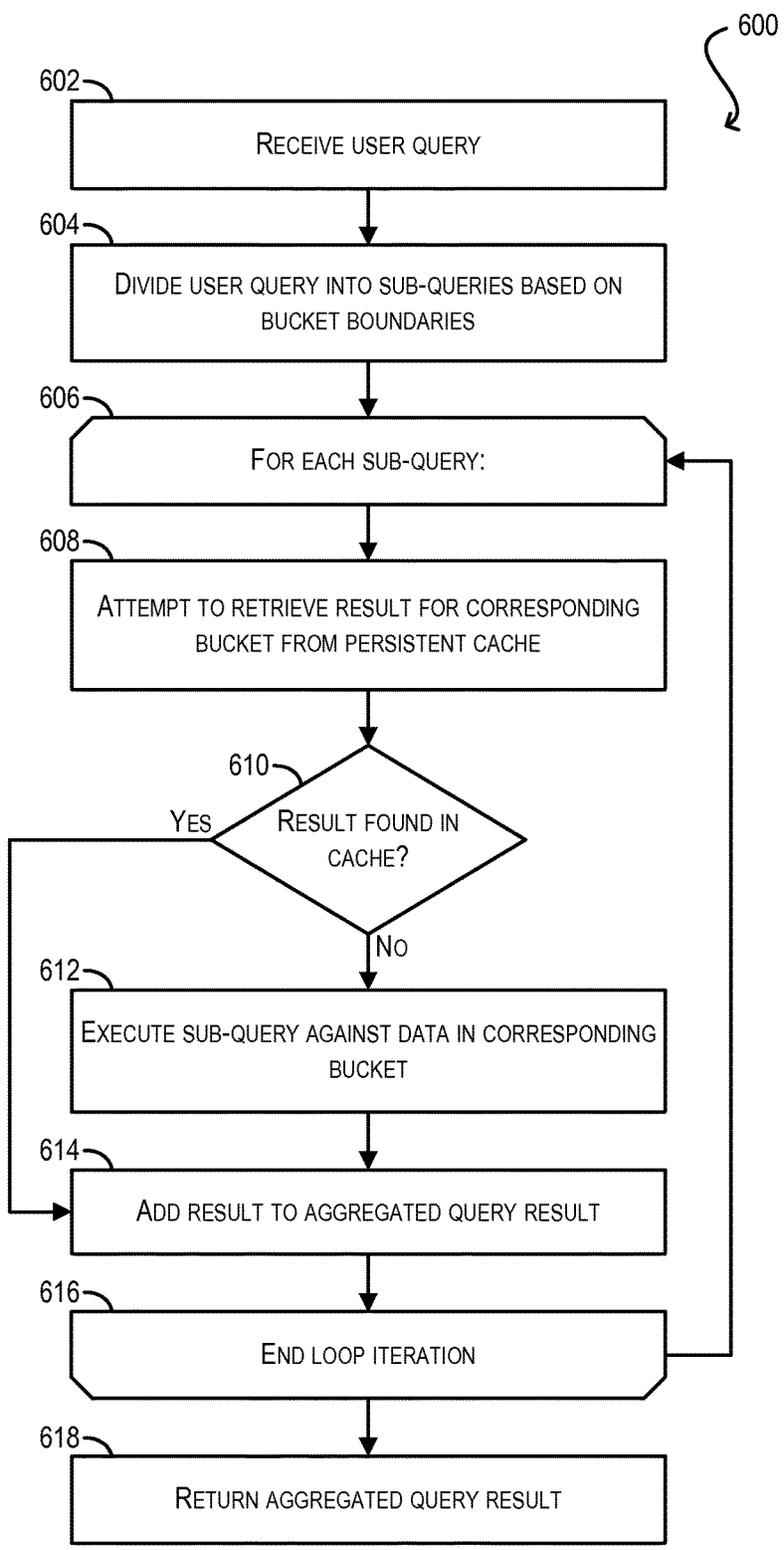
FIG. 6 depicts a flowchart for processing a user query in view of the cached query results according to an embodiment.

Finally FIG. 6 depicts a flowchart 600 that can be performed by query execution module 118 in order to process a user query (per blocks 210-214 of FIG. 2) according to an embodiment.

At block 602 of flowchart 600, query execution module 118 can receive an incoming user query. In response, query execution module 118 can divide the user query into a number of sub-queries, where each sub-query corresponds to the dimensional range of a bucket in the system (block 604). It should be noted that some sub-queries may span the entire range of a sealed bucket, while other sub-queries may only span part of the range of a bucket (e.g., sub-queries corresponding to the current open bucket).

At block 606, query execution module 118 can enter a loop for each of the sub-queries created at block 604. Within the loop, query execution module 118 can first attempt to retrieve the result corresponding to the sub-query's bucket from persistent cache 220 (block 608). If the result is in the cache, query execution module 118 can add the cached result to an aggregated query result for the user query (blocks 610, 614).

Otherwise, if the result is not in the cache, query execution module 118 can execute the sub-query against the data in its corresponding bucket (block 612). Query execution module 118 can then add the generated result to the aggregated query result (block 614).

At block 616, the current loop iteration can end, and query execution module 118 can repeat loop 606 until all sub-queries for the user query have been processed. Finally, query execution module 118 can return the aggregated query result to the user that originated the query (block 618).

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Many variations, modifications, additions, and improvements to the embodiments described herein are possible. For example, plural instances can be provided for components, operations, or structures described herein as a single instance. Further, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for reducing query response time, the method comprising:
   organizing, by a computer system, data into a plurality of buckets, the data being ordered according to a dimension, each bucket including a subset of the data that corresponds to a range within the dimension;
   for one or more buckets in the plurality of buckets, precomputing, by the computer system, query results for one or more queries against the one or more buckets, wherein the one or more queries are determined by:
      monitoring incoming user queries;
      normalizing the user queries by removing any constraints pertaining to the dimension; and
      processing the normalized user queries to identify a list of top K queries that are likely to be submitted again;
   storing, by the computer system, the precomputed query results in a cache;
   receiving, by the computer system, a user query;
   dividing, by the computer system, the user query into a plurality of sub-queries, each sub-query corresponding to an instance of the user query that is constrained to data within a bucket in the plurality of buckets;
   generating a query result for the user query based on whether, for each sub-query in the plurality of sub-queries, a precomputed query result exists in the cache; and
   returning the query result in response to the user query.

2. The method of claim 1 wherein generating the query result for the user query comprises:
   for each sub-query:
      if a precomputed query result for the sub-query exists in the cache, adding the precomputed query result to the query result for the user query; and
      if a precomputed query result for the sub-query does not exist in the cache:
         executing the sub-query against its corresponding bucket to generate a sub-query result; and
         adding the sub-query result to the query result for the user query.

3. The method of claim 1 wherein the organizing comprises, at the time of receiving a piece of data:
   adding the piece of data to an open bucket in the plurality of buckets; and
   if the open bucket has reached or exceeded a predetermined size:
      sealing the open bucket; and
      creating a new open bucket.

4. The method of claim 3 wherein the precomputing is only performed against sealed buckets in the plurality of buckets.

5. The method of claim 4 wherein the precomputing is performed at the time of sealing a bucket.

6. The method of claim 1 wherein the dimension is time.

7. The method of claim 1 wherein the monitoring, the normalizing, and the processing are performed on a continuous basis during runtime of the computer system.

8. A non-transitory computer readable storage medium having stored thereon software executable by a computer system, the software embodying a method that comprises:
   organizing data into a plurality of buckets, the data being ordered according to a dimension, each bucket including a subset of the data that corresponds to a range within the dimension;
   for one or more buckets in the plurality of buckets, precomputing query results for one or more queries against the one or more buckets, wherein the one or more queries are determined by:
      monitoring incoming user queries;
      normalizing the user queries by removing any constraints pertaining to the dimension; and
      processing the normalized user queries to identify a list of top K queries that are likely to be submitted again;
   storing the precomputed query results in a cache;
   receiving, by the computer system, a user query;
   dividing, by the computer system, the user query into a plurality of sub-queries, each sub-query corresponding to an instance of the user query that is constrained to data within a bucket in the plurality of buckets;
   generating a query result for the user query based on whether, for each sub-query in the plurality of sub-queries, a precomputed query result exists in the cache; and
   returning the query result in response to the user query.

9. The non-transitory computer readable storage medium of claim 8 wherein generating the query result for the user query comprises:
   for each sub-query:
      if a precomputed query result for the sub-query exists in the cache, adding the precomputed query result to the query result for the user query; and
      if a precomputed query result for the sub-query does not exist in the cache:
         executing the sub-query against its corresponding bucket to generate a sub-query result; and
         adding the sub-query result to the query result for the user query.

10. The non-transitory computer readable storage medium of claim 8 wherein the organizing comprises, at the time of receiving a piece of data:
   adding the piece of data to an open bucket in the plurality of buckets; and
   if the open bucket has reached or exceeded a predetermined size:
      sealing the open bucket; and
      creating a new open bucket.

11. The non-transitory computer readable storage medium of claim 10 wherein the precomputing is only performed against sealed buckets in the plurality of buckets.

12. The non-transitory computer readable storage medium of claim 11 wherein the precomputing is performed at the time of sealing a bucket.

13. The non-transitory computer readable storage medium of claim 8 wherein the dimension is time.

14. The non-transitory computer readable storage medium of claim 8 wherein the monitoring, the normalizing, and the processing are performed on a continuous basis during runtime of the computer system.

15. A computer system comprising:
   a processor; and
   a non-transitory computer readable medium having stored thereon program code that causes the processor to, upon being executed:
      organize data into a plurality of buckets, the data being ordered according to a dimension, each bucket including a subset of the data that corresponds to a range within the dimension;
      for one or more buckets in the plurality of buckets, precompute query results for one or more queries against the one or more buckets, wherein the one or more queries are determined by:
         monitoring incoming user queries;
         normalizing the user queries by removing any constraints pertaining to the dimension; and
         processing the normalized user queries to identify a list of top K queries that are likely to be submitted again;
      store the precomputed query results in a cache;
      receive a user query;
      divide the user query into a plurality of sub-queries, each sub-query corresponding to an instance of the user query that is constrained to data within a bucket in the plurality of buckets;
      generate a query result for the user query based on whether, for each sub-query in the plurality of sub-queries, a precomputed query result exists in the cache; and
      return the query result in response to the user query.

16. The computer system of claim 15 wherein the program code that causes the processor to generate the query result for the user query comprises program code that causes the processor to:
   for each sub-query:
      if a precomputed query result for the sub-query exists in the cache, add the precomputed query result to the query result for the user query; and
      if a pre-computed query result for the sub-query does not exist in the cache:
         execute the sub-query against its corresponding bucket to generate a sub-query result; and
         add the sub-query result to the query result for the user query.

17. The computer system of claim 15 wherein the program code that causes the processor to organize the data into the plurality of buckets comprises program code that causes the processor to, at the time of receiving a piece of data:
   add the piece of data to an open bucket in the plurality of buckets; and
   if the open bucket has reached or exceeded a predetermined size:
      seal the open bucket; and
      create a new open bucket.

18. The computer system of claim 17 wherein the precomputing is only performed against sealed buckets in the plurality of buckets.

19. The computer system of claim 18 wherein the precomputing is performed at the time of sealing a bucket.

20. The computer system of claim 15 wherein the dimension is time.

21. The computer system of claim 15 wherein the monitoring, the normalizing, and the processing are performed on a continuous basis during runtime of the computer system.

* * * * *